United States Patent Office.

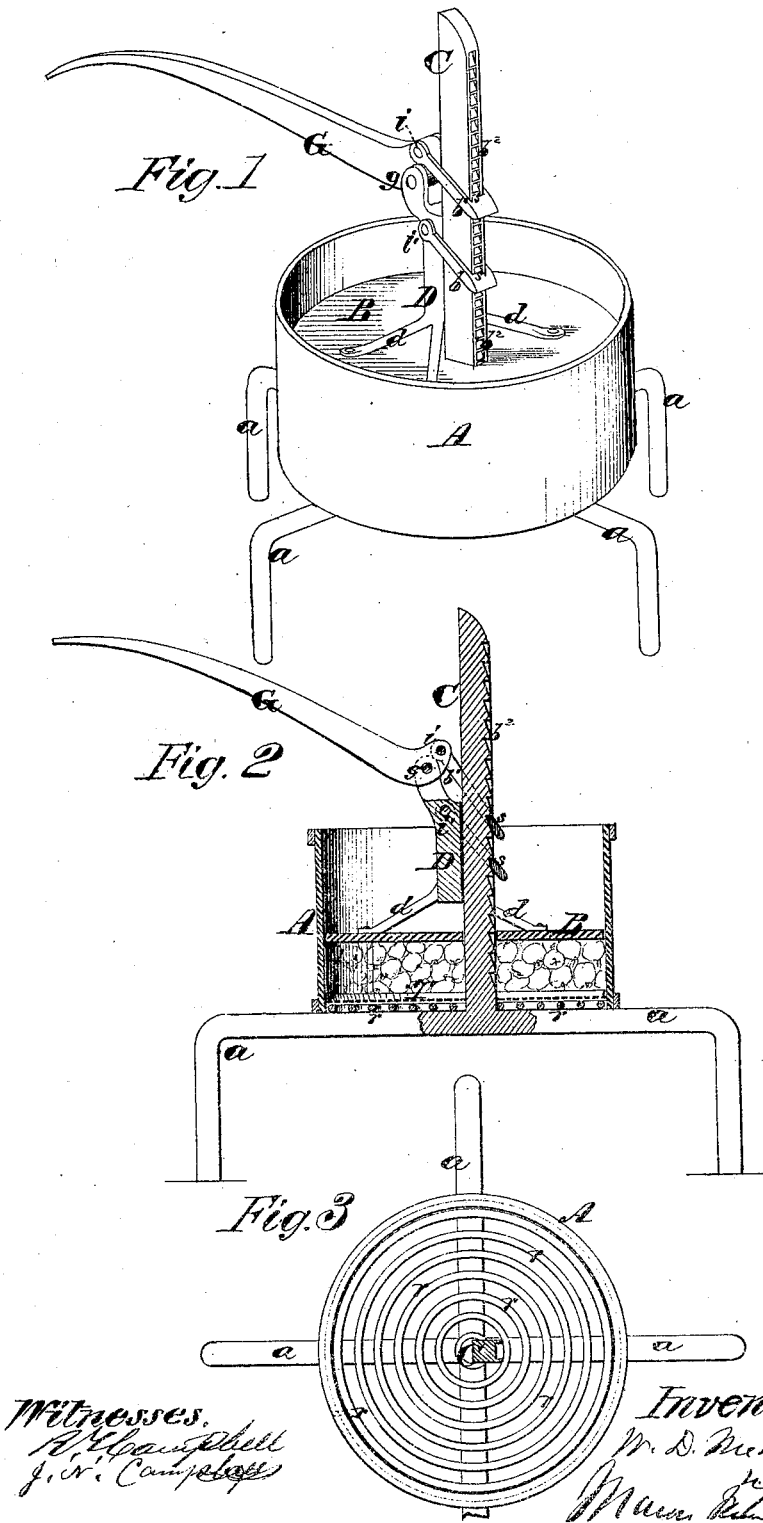

W. D. MEDBERY, OF BANGOR, WISCONSIN.

Letters Patent No. 101,294, dated March 29, 1870.

IMPROVEMENT IN PRESS AND STRAINER COMBINED.

The Schedule referred to in these Letters Patent and making part of the same.

*To all whom it may concern:*

Be it known that I, W. D. MEDBERY, of Bangor, in the county of La Crosse and State of Wisconsin, have invented a new and improved Press and Strainer Combined; and I do hereby declare that the following is a full, clear, and exact description thereof, reference being had to the accompanying drawings making part of this specification, in which—

Figure 1 is a perspective view of my combined press and strainer.

Figure 2 is a section taken vertically through the center of the press and strainer.

Figure 3 is a top view of the curb with the follower and strainer removed.

Similar letters of reference indicate corresponding parts in the several figures.

This invention relates to improvements which are designed for pressing fruits and other substances and at the same time straining the juice or liquor.

It consists in the construction upon the skeleton frame of the curb of a vertical rack, in combination with double-acting dogs, a vibrating lever, and a pressing follower, as will be hereinafter explained.

To enable others skilled in the art to understand my invention, I will describe its construction and operation.

In the accompanying drawings—

A represents the curb of the press, which curb is preferably made of cylindrical form, and is mounted upon a skeleton frame composed of two bars, $a\ a$, of equal length, united at the middle of their length, and terminated in legs, as shown in figs. 1 and 2.

This frame may be made of either cast or wrought metal, and centrally upon it the curb A is rigidly secured.

The bottom of the curb A is formed by a number of concentric rings $r\ r$, which are secured permanently upon the four radial rods $a$ of the supporting-frame, and these rings collectively afford firm support to a strainer, T, which latter may be made of woven wire or of thickly-perforated sheet metal, secured to a ring of such diameter as will allow it to fit loosely within the curb A, as shown in fig. 2.

From one of the rods $a$ and on one side of the center of the curb rises perpendicularly a narrow rectangular bar, C, having teeth $b^2$ formed in one of its straight edges, as shown in figs. 1 and 2.

This bar C passes up through holes made through the strainer T and follower B, and extends some distance above the top of the curb, and forms a rack and guide for the devices used to operate the follower.

The hole through the follower for the bar C is made of such size as will allow the former to move up and down freely.

The teeth $b^2$ in the edge of the rack-bar C are made so as not to catch the follower while removing the latter from the machine.

D represents a standard, which is secured by its diverging legs $d$ to the follower B, so as to stand perpendicularly thereto.

This standard is in or nearly in the vertical center of the follower, and lies snugly against that edge of the bar C opposite the toothed edge $b^2$.

To this standard, at $i'$, a looped dog or pawl, $b$, is pivoted, which embraces bar C and engages with the teeth of this bar, as shown in figs. 1 and 2.

There is also pivoted to the upper forked end of the standard D, at $g$, a lever, G, to the shortest arm of which, at $i$, looped dog, $b^1$, is pivoted, which dog embraces the bar C and engages with the teeth of this bar, like the dog $b$.

By disengaging the teeth $s\ s$ of the two gravitating dogs $b\ b^1$ from the teeth of rack-bar C, the follower B and its attachments can be lifted away, and access obtained to the interior of the curb A.

The substance to be pressed is put into the curb, upon its strainer-bottom T, the follower is returned to its place and pressed down upon the substance in the curb, and the press is ready for operation.

The attendant then takes hold of lever G, and by vibrating this lever forcibly depresses the follower and squeezes the juice through the strainer into a vessel placed beneath the press.

It will be seen that the dog $b$ engages with the teeth $b^2$ on rack-bar C and holds the follower down, while the long arm of lever G is being raised, to adjust the dog $b^1$ for giving a descending stroke to the follower.

When sufficient compression has been applied to the substance in the curb, the teeth $s\ s$ of the two dogs $b\ b^1$ are disengaged from the teeth of rack-bar C and the follower lifted away.

Having described my invention,

What I claim is—

1. The rack-bar C, constructed upon the frame $a$ and on one side of the center of the curb A, substantially as described.

2. The gravitating dogs $b\ b^1$, rack-bar C, standard D, lever G, and follower B, combined with the curb A and frame $a$, substantially as described.

W. D. MEDBERY.

Witnesses:
D. J. JENKINS,
WILLIAM R. WILLIAMS.